United States Patent
Peters

(10) Patent No.: US 9,671,026 B2
(45) Date of Patent: Jun. 6, 2017

(54) GRID FLAP

(71) Applicant: MULTIPOND Wägetechnik GmbH, Waldkraiburg (DE)

(72) Inventor: Andreas Peters, Aschau am Inn (DE)

(73) Assignee: MULTIPOND WÄGETECHNIK GMBH, Waldkraiburg (DE)

(*) Notice: Subject to any disclaimer, the term of this patent is extended or adjusted under 35 U.S.C. 154(b) by 11 days.

(21) Appl. No.: 14/487,691

(22) Filed: Sep. 16, 2014

(65) Prior Publication Data

US 2015/0076383 A1   Mar. 19, 2015

(30) Foreign Application Priority Data

Sep. 16, 2013 (DE) .................. 10 2013 218 518

(51) Int. Cl.
*F16K 1/16* (2006.01)
*G01G 23/02* (2006.01)
*B23P 15/00* (2006.01)

(52) U.S. Cl.
CPC .............. *F16K 1/16* (2013.01); *B23P 15/001* (2013.01); *G01G 23/02* (2013.01)

(58) Field of Classification Search
CPC ........ G01G 17/08; G01G 21/22; G01G 21/23; G01G 21/28; G01G 23/02; A01K 1/0023; A01K 1/10; B65D 19/10; B65D 2519/00059; B65D 2519/00293; B65D 2519/00298; F16K 1/16; B23P 15/001
USPC ........... 222/77, 189.02–189.11; 177/89, 142, 177/238–242; 119/511, 842; 29/891, 29/33 B, 33 F, DIG. 4, DIG. 48
See application file for complete search history.

(56) References Cited

U.S. PATENT DOCUMENTS

| | | | | |
|---|---|---|---|---|
| 3,611,997 A * | 10/1971 | Benno | .................. | A01K 1/0151 119/51.01 |
| 4,005,758 A * | 2/1977 | Johnson | ................... | G01G 3/10 177/196 |
| 4,533,008 A * | 8/1985 | Ostermann | ............ | G01G 17/08 177/132 |
| 5,734,128 A * | 3/1998 | Gades | .................... | G01G 17/08 177/132 |
| 6,868,804 B1 * | 3/2005 | Huisma | ................ | A01K 11/006 119/51.02 |

(Continued)

FOREIGN PATENT DOCUMENTS

| | | |
|---|---|---|
| AU | 654609 B2 | 11/1994 |
| DE | 2460846 A1 | 6/1976 |

(Continued)

OTHER PUBLICATIONS

European Office Action dated Jun. 11, 2015 for the Corresponding European Patent Application No. 14 184 862.2.

(Continued)

*Primary Examiner* — Paul R Durand
*Assistant Examiner* — Andrew P Bainbridge
(74) *Attorney, Agent, or Firm* — Hassan Abbas Shakir; Katten Muchin Rosenman LLP

(57) ABSTRACT

The invention relates to a grid flap (1) for use in a filling device or scale, especially in food processing, wherein the grid flap (1) comprises a metal frame (2) and a metal grid (4), and wherein the grid (4) comprises a plurality of braces (4h, 4v), which are connected to the frame (2) on their respective final sections.

12 Claims, 3 Drawing Sheets

(56) References Cited

U.S. PATENT DOCUMENTS

| | | | | |
|---|---|---|---|---|
| 2002/0113043 A1* | 8/2002 | Cook | ............. | B01D 29/012 |
| | | | | 219/85.22 |
| 2003/0192487 A1* | 10/2003 | Zimmerman | ......... | A01K 29/00 |
| | | | | 119/842 |
| 2012/0048206 A1* | 3/2012 | Eakin | ............. | A01K 29/00 |
| | | | | 119/515 |

FOREIGN PATENT DOCUMENTS

| | | |
|---|---|---|
| DE | 9309927 U1 | 9/1993 |
| DE | 9402531 U1 | 5/1994 |
| DE | 4410518 A1 | 6/1995 |
| DE | 10137180 A1 | 3/2002 |
| GB | 2 421 206 A | 6/2006 |

OTHER PUBLICATIONS

German Office Action dated May 6, 2014 for the Corresponding German Patent Application No. 10 2013 218 518.9.

Extended European Search Report dated Nov. 27, 2014 for the Corresponding European Patent Application No. 14184862.2.

Office Action dated Jul. 13, 2016 issued by the German Patent Office in related application 10 2013 218 518.9, partial machine translation is provided.

\* cited by examiner

GRID FLAP

BACKGROUND OF THE INVENTION

1. Field of the Invention

The invention relates to a grid flap, especially a grid flap for filling devices or scales, used in the field of food technology.

2. Description of the Related Art

For filling devices and scales, tanks and containers are known, which often comprise synchronously operated opening flaps. Depending on the product requirement, such opening flaps can be designed as grid flaps. This is especially advantageous, if the product to be filled or weighted has a sticky texture. In such a case, surfaces of members, which get in contact with the product, should be kept as small as possible to prevent adhesion.

By providing a flap with a plurality of braces arranged next to each other or on top of each other, it is possible to fulfill the above-mentioned requirements.

From the state of the art, such grid flaps are already known. Those can consist particularly of two sheet metal plates, a grid for pouring is jammed between them. A further known embodiment of the grid flaps relates to those which comprise a frame made of plastic, over which a wire netting is bent. For better fixation of the grid on the frame made of plastic, the plastic is molten at respective positions to which the wire netting is then pushed.

A serious disadvantage when using plastic is, that for example crystalline products lead to an abrasion of the plastic surface, that is why plastic residues can get into the food products. Further, parts made of plastic quickly become fragile and underlie deformations. This is especially valid if it is tried to clean the parts made of plastic with high temperatures, practically disabling hygienic process conditions.

Although both above-described types of grid flaps are often only used in filling devices or scales for microbially relatively immune food, wherein the requirements for hygienic design are relatively low, an optimal food safety can be guaranteed only then, if the member is fabricated in a way that no single wire ends and sharp edges protrude, on which food residues might adhere, or no gaps between wire and frame, which are difficult to clean, can be formed, in which product residues can also accumulate. Further, the formation of cavities should be avoided for hygienical reasons. This problem can, however, be especially observed at the above-mentioned grid flaps, which are fabricated from sheet metal plates, wherein a grid is aligned between the sheet metal plates.

Furthermore, the known grid flaps are not suitable for a series production by machines and have to be produced individually by hand, which entails the disadvantage that the quality of the member depends on the skill and experience of the craftsman and can thus largely vary.

SUMMARY OF THE INVENTION

Thus, it is the object of the invention to provide a grid flap for a filling device or scale, which overcomes the above-mentioned problems.

The invention provides a grid flap for filling devices or scales, especially in the field of food processing, which comprises a frame, on which a grid is stretched. Both frame and grids are preferentially fabricated from metal. Both can be fabricated from the same material. It is required in each case that the wire netting can be adhered to the frame by welding.

The grid is provided in a way that it comprises a plurality of braces, which are welded to the frame with their respective end sections. The braces can thereby be arranged horizontally or vertically parallel to each other. In one embodiment of the invention, a first part of the braces can be horizontally and the second part of the braces can be vertically aligned, wherein the first and second parts of the braces can then be respectively arranged crosswise above each other. In an especially preferential embodiment of the invention, a first part of the braces is arranged horizontally and the second part of the braces is arranged vertically, and they are mesh-like interwoven with each other. In each of the above-mentioned embodiments, the grid is connected along an outer section of the metal frame with the same by welding.

A method for fabrication of a preferential grid flap is described in the following:

Firstly, a plurality of wire braces is provided, of which preferentially a first part is aligned horizontally and a second part is aligned vertically in a respective predetermined distance from each other. The wire braces are interwoven subsequently in a way that a grid-like wire netting is formed. The wire netting is now cut and thus adapted to the metal frame, so that each wire end lies on the metal frame and can be welded to it. If a pre-manufactured wire netting is used, the respective last cross brace is removed at each edge after cutting, so that the end sections of the single braces are longer than a mesh width of the grid structure. To enable an accurate welding of each one of the wire ends with the metal frame, firstly, each wire end is provided such that it lies with a predetermined length on the metal frame. Additionally, each of the wire ends can be aligned in a way so that it lies flatly on the frame, more preferentially even bent in a way that it points in the direction of the metal frame and thus even provides safe contact with the frame. Furthermore, the wire netting is preferentially adapted in a way that the respective last cross brace of the horizontally and vertically arranged braces still lies on the frame.

The frame is positioned on a magnet device. Here, a template can be provided in the magnet device, into which the frame can be exactly inserted. However, respective recesses can be provided in the frame itself, in which suitable fixation means can be installed in order to secure the frame on the magnet device. Subsequently, the pre-manufactured grid cut is adapted to the frame and is fixed as well by suitable means. The members to be welded are pressed together with an electromagnet. The free wire ends are connected with the metal frame by welding, preferentially by laser welding.

By providing of the respective last cross braces in a way that they rest on the frame, as well as by pressing of the grid on the frame during welding itself, a permanent static preload force of the wire ends and the last cross brace against the frame is achieved, which can counteract a cyclic loading of the wire ends while using the grid flap in operation. The single wires and especially the wire ends are not subjected to any elastic deformation in normal operation.

To prevent elastic deformation of the grid by the electromagnet and to improve the strength of the grid flap in general, the frame can comprise a sub-structure, which is preferentially integrally formed with the frame. The sub-structure can thereby comprise any shape and is preferentially formed by cutting off respective parts from a sheet- or massive metal plate with a laser cutter. The recesses formed thereby should be dimensioned in a way so that the grid rests evenly on the sub-structure. Furthermore, it is possible to weld the grid to the sub-structure.

Furthermore, preferentially respective fixation means are provided on the frame, on which the grid flap can be supported pivotedly. Furthermore, it can be reasonable to provide respective recesses in the frame by cutting with a laser cutter, which generally enables a weight reduction of the grid flap.

In the following, the invention will be further explained by one embodiment by reference to the figures.

DETAILED DESCRIPTION OF THE INVENTION

Figure 1:
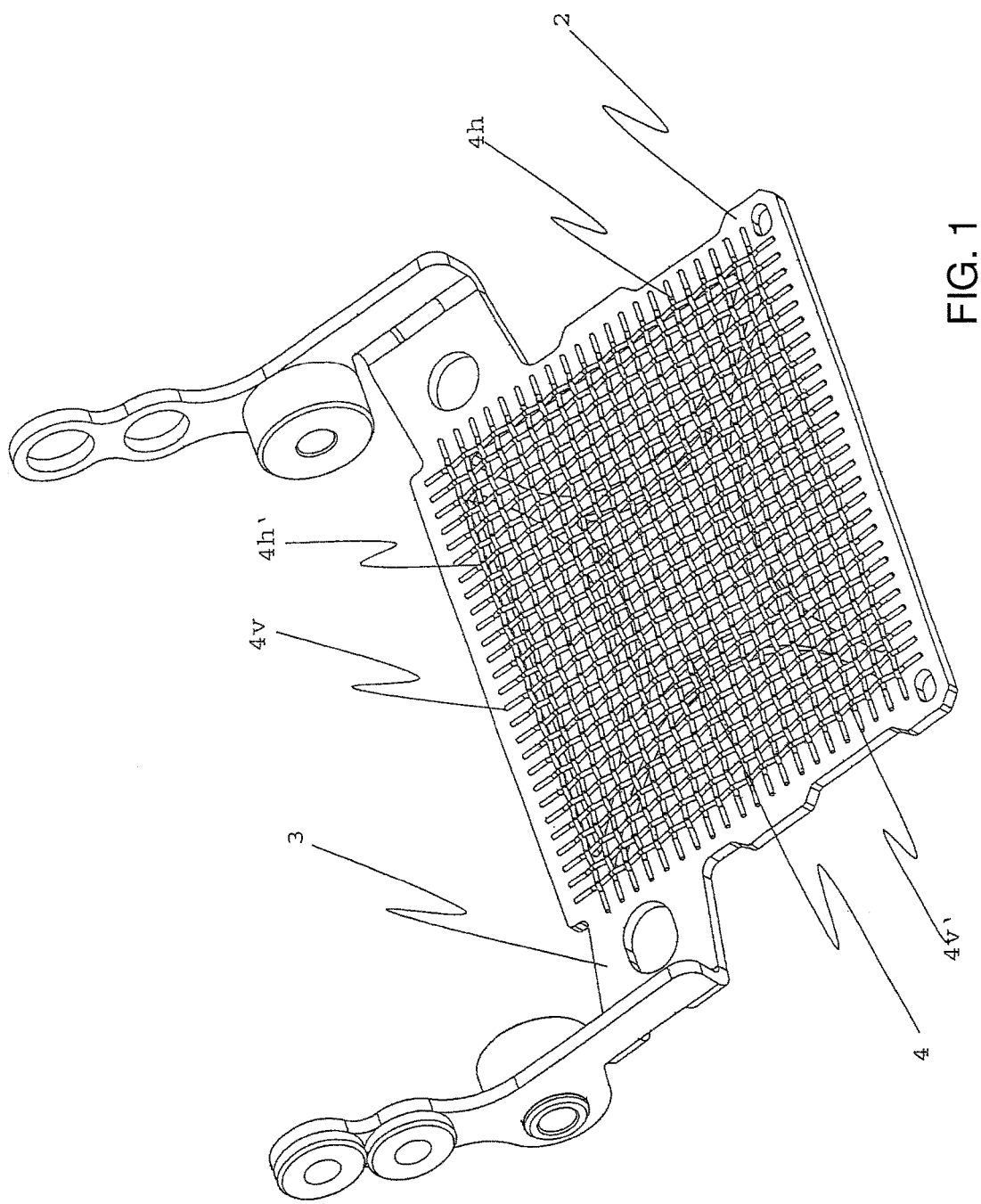
FIG. 1 shows an oblique view of the grid flap according to the invention.

As depicted in FIG. 1, the grid flap 1 according to the invention has a rectangle-shaped frame 2. On the upper end of the frame, two laterally, related to the shorter side, opposing supporting arms 3 are provided, which are preferentially chamfered and act as fixation means. At the chamfered section of each of the supporting arms 3, openings are provided, on which the grid flap, can be pivotedly supported on a container of a filling device or scale, for example by pins. The openings at the laterally projecting sections are provided to fix the metal frame 2 to a magnet device by suitable means. Furthermore, the frame has a grid sub-structure 5, which will be further described in FIG. 2.

The grid 4 itself consists of a plurality of horizontally 4h and vertically 4v aligned wire braces, which are interwoven like a mesh. The respective utmost of the respective cross and longitudinal braces 4h' and 4v' are provided in a way that they barely rest on the frame 2. Thereby, a preload force is achieved, which mainly contributes to the strength of the grid 4. Each end of each of the wire braces 4h and 4v is flattened and respectively welded along a periphery of the frame 2 with the frame 2. Through the mesh-like interweaving of the wire braces 4h and 4v with each other and the welding of the respective wire ends on the metal frame 2, a stable and process-reliable mesh construction is formed.

Figure 2:
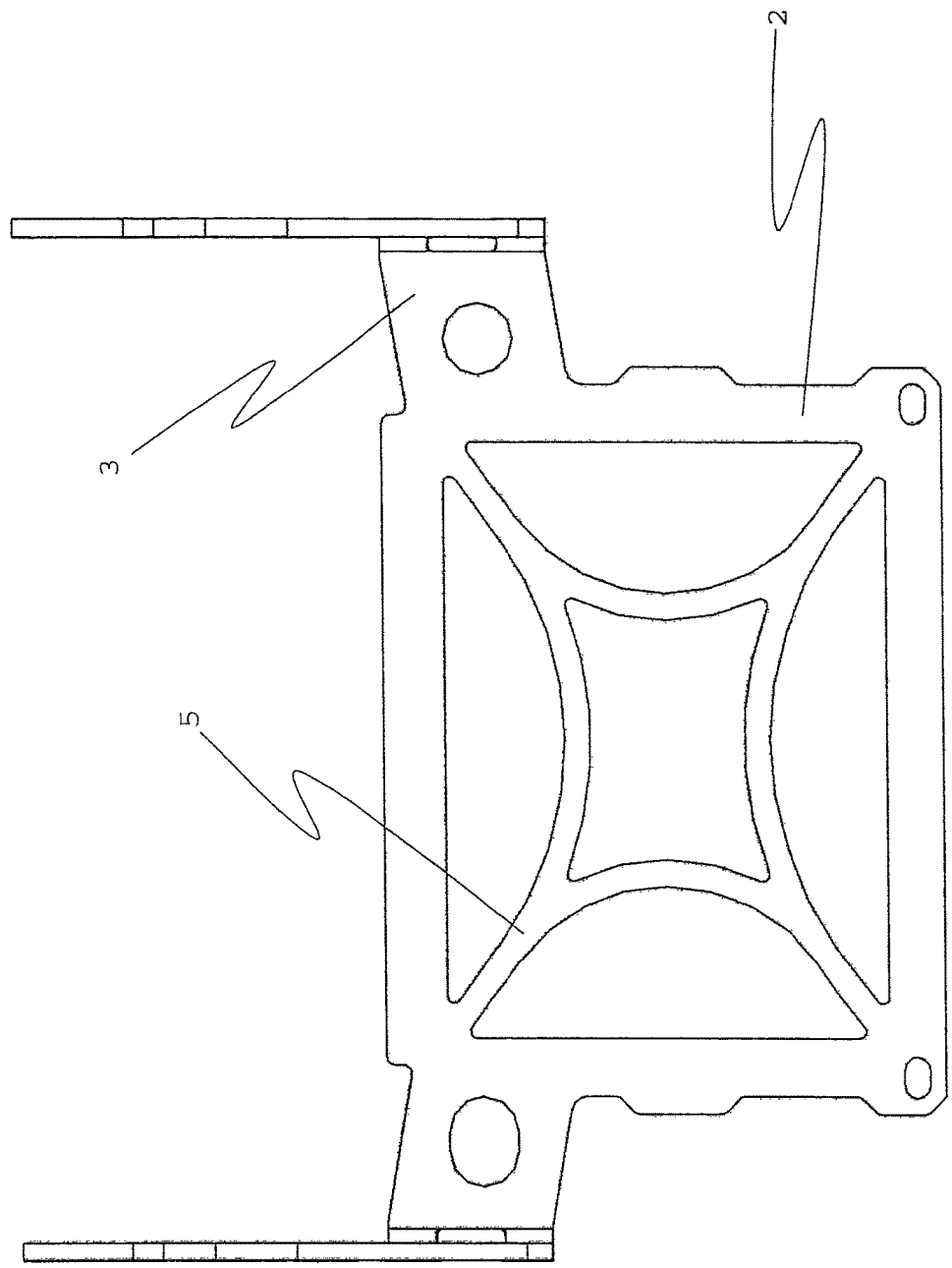
FIG. 2 shows a front view of the frame according to the invention.

As obvious from FIG. 2, the frame 2 has a grid-substructure 5 in the form of arch-segmented formed braces, which are integrally formed with the frame 2. The braces are formed by cutting of respective pieces from the metal frame 2 by a laser cutter.

Figure 3:
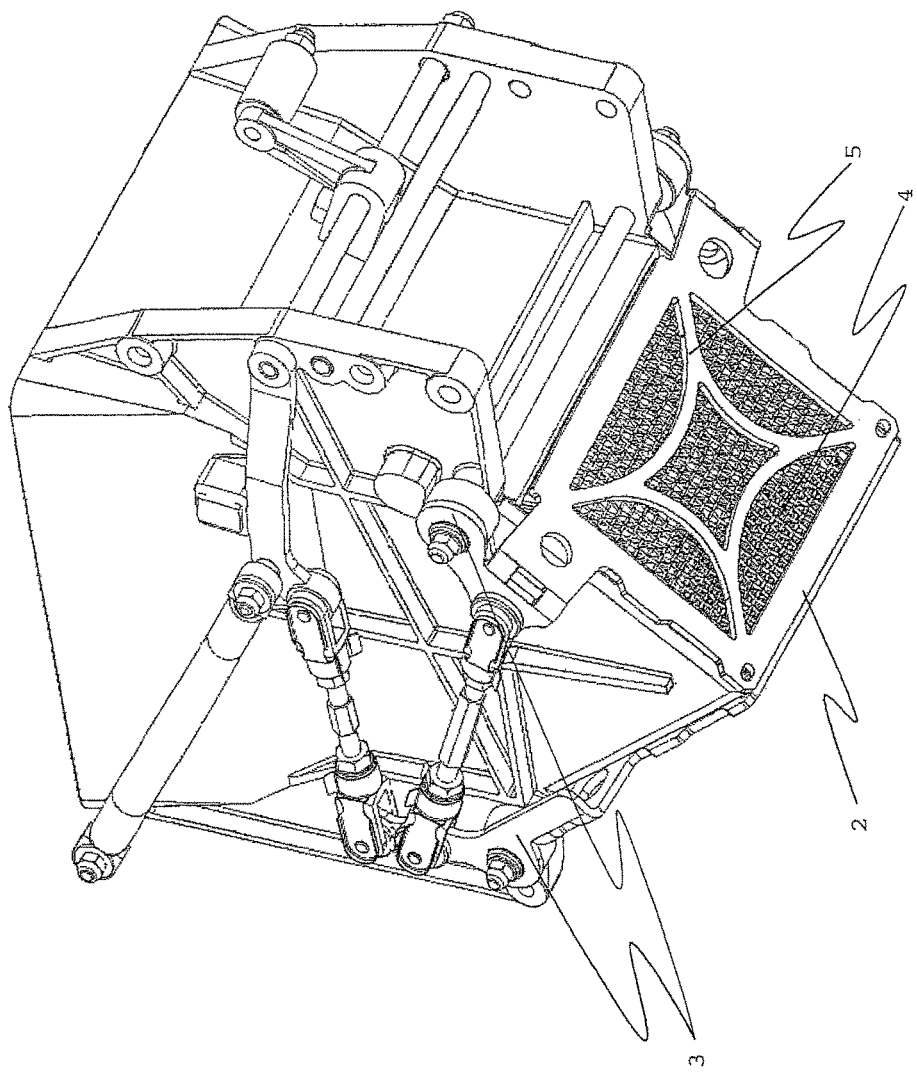
FIG. 3 shows an oblique view of the grid flap according to the present invention on a scale or filling device.

The grid flaps 1 according to the invention can be supported pivotedly at the supporting arms 3 by suitable fixation means on a container of a scale or filling device, as obvious from FIG. 3. Thereby, the flaps 1 open or close the funnel-shaped containers of the scale or filling device synchronously.

With the above-described grid flap, the danger of breaking of wire significantly decreases despite continuous stress, and a high product safety can be guaranteed.

As shown in FIG. 1, a last brace of a first set of braces completely lies on the frame and a last brace of a second set of braces completely lies on the frame.

What is claimed is:

1. In combination, a grid flap and a measuring device, the combination comprising:
   the measuring device;
   the grid flap comprising
   a metal grid comprising a plurality of braces; and
   a metal frame, the frame surrounding the grid, the frame comprising a periphery;
   wherein the plurality of braces comprises a first set of braces and a second set of braces,
   the braces of the first set of braces being oriented substantially perpendicularly to the braces of the second set of braces,
   the braces of the first set of braces being parallel to each other, and
   the braces of the second set of braces being parallel to each other;
   wherein each brace of the plurality of braces comprises an end section, each end section of the wire braces being flattened and being welded on a periphery of the frame; and
   wherein a last brace of the first set of braces completely lies on the frame and a last brace of the second set of braces completely lies on the frame,
   wherein the end sections of the single braces are longer than a mesh width of the grid structure.

2. The combination according to claim 1, wherein the frame comprises a sub-structure for the grid.

3. The combination according to claim 2, wherein the sub-structure is integrally formed with the frame.

4. The combination according to claim 1, wherein the braces of the first set and the braces of the second set are interwoven with each other in a mesh-like structure to form the grid.

5. The combination according to claim 1, wherein the end sections are formed in parallel with a plane of the frame.

6. The combination according to claim 1, wherein the end section after a last cross brace is longer than a mesh width of the grid.

7. A scale comprising:
   a measuring device; and
   a grid flap comprising
      a metal grid comprising a plurality of braces; and
      a metal frame, the frame surrounding the grid, the frame comprising a periphery;
      wherein the plurality of braces comprises a first set of braces and a second set of braces,
         the braces of the first set of braces being oriented substantially perpendicularly to the braces of the second set of braces,
         the braces of the first set of braces being parallel to each other, and
         the braces of the second set of braces being parallel to each other;
      wherein each brace of the plurality of braces comprises an end section, each end section being flattened and being welded on a periphery of the frame; and
      wherein a last brace of the first set of braces completely lies on the frame and a last brace of the second set of braces completely lies on the frame,
   wherein the end sections of the single braces are longer than a mesh width of the grid structure.

8. The scale according to claim 7, wherein the frame comprises a sub-structure for the grid.

9. The scale according to claim 8, wherein the sub-structure is integrally formed with the frame.

10. The scale according to claim 7, wherein the braces of the first set and the braces of the second set are interwoven with each other in a mesh-like structure to form the grid.

11. The scale according to claim 7, wherein the end sections are formed in parallel with a plane of the frame.

12. The scale according to claim 7, wherein the end section after a last cross brace is longer than a mesh width of the grid.

\* \* \* \* \*